United States Patent
Meador

(10) Patent No.: US 6,974,855 B1
(45) Date of Patent: *Dec. 13, 2005

(54) POLYIMIDES BY PHOTOCHEMICAL CYCLOPOLYMERIZATION

(75) Inventor: Michael A. Meador, Strongsville, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 150 days.

This patent is subject to a terminal disclaimer.

(21) Appl. No.: 10/617,447

(22) Filed: Jul. 8, 2003

Related U.S. Application Data

(63) Continuation-in-part of application No. 09/827,140, filed on Apr. 5, 2001, now Pat. No. 6,593,389.

(51) Int. Cl.⁷ ............................................. C08G 12/00
(52) U.S. Cl. ...................... 528/228; 528/220; 522/167
(58) Field of Search ................................ 522/178, 167; 528/220, 228; 526/316

(56) References Cited

U.S. PATENT DOCUMENTS

| | | | | |
|---|---|---|---|---|
| 6,140,385 A | * | 10/2000 | Bowers et al. | 522/37 |
| 6,153,662 A | * | 11/2000 | Miller et al. | 522/63 |
| 6,593,389 B1 | * | 7/2003 | Meador | 522/36 |

OTHER PUBLICATIONS

Macromolecules vol. 29, No. 27, pp. 8983-8986.
NASA News, Sampe Jour. vol. 36, No. 5, Sep. 2000, Jones et al, "Curable Polyimides . . . ".
Lewis Research Ctr, "Room Temperature Ultraviolet Curing of Polyimides", NASA Tech Briefs, Mar. 1999.

* cited by examiner

Primary Examiner—Susan Berman
(74) Attorney, Agent, or Firm—Kent N. Stone; James V. Tura

(57) ABSTRACT

The novel polyimides of this invention are derived from Diels-Alder cyclopolymerization of photochemically generated bisdienes with dienophiles, such as bismaleimides, trismaleimides and mixtures thereof with maleimide end-caps. Irradiation of one or more diketones produces two distinct hydroxy o-quinodimethane (photoenol) intermediates. These intermediates are trapped via Diels-Alder cycloaddition with appropriate dienophiles, e.g., bismaleimide and/or trismaleimides to give the corresponding polyimides in quantitative yields. When bismaleimides, trismaleimides or mixtures thereof with maleimide end-caps are used as the dienophile, the resulting polyimides have glass transition temperatures (Tg) as high as 300° C. Polyimide films can be prepared by ultraviolet irradiation of high solids content varnishes of the monomers in a small amount of solvent, e.g., cyclohexanone, dimethyl formamide, N-methylpyrollidone and the like. These novel polyimides are characterized as having high glass transition temperatures, good mechanical properties and improved processing in the manufacture of adhesives, electronic materials and films.

20 Claims, No Drawings

POLYIMIDES BY PHOTOCHEMICAL CYCLOPOLYMERIZATION

RELATED U.S. APPLICATION

This application is a continuation-in-part of application Ser. No. 09/827,140 filed Apr. 5, 2001, now U.S. Pat. No. 6,593,389.

ORIGIN OF THE INVENTION

The invention described herein was made by an employee of the United States Government and may be manufactured and used by or for the Government for governmental purposes without the payment of any royalties thereon or therefore.

BACKGROUND OF THE INVENTION

1. Field of the Invention

Polymers having high-temperature characteristics are required to improve the performance and to reduce the weight of industrial materials in electronic devices, aeronautical equipment and in some machinery. The polyimides and polyacrylates are polymers known to have the required mechanical strength, dimensional stability, low coefficient of thermal expansion, and electrical insulation properties in addition to high-temperature resistance.

The preparation of high performance polymers, however, requires cure temperatures in excess of 200° C. This leads to high tooling costs, high processing costs, and processing induced thermal stresses that can compromise component durability. The process of this invention allows the curing of high performance polyimides and polyacrylates at or near room temperature. This invention enables the cure of high performance polyimides and polyacrylates at or near room temperature by using ultraviolet light or some other radiation sources, such as electron beams rather than heat to provide the cure energy. Specifically, this invention relates to the Diels-Alder cyclopolymerization of photochemically generated dienes with dienophiles, such as bismaleimides and mixtures thereof with a maleimide end-cap and trismaleimides. Irradiation of an aromatic diketone produces two distinct hydroxy o-quinodimethane (photoenol) intermediates. The intermediates are trapped via a Diels-Alder cycloaddition with appropriate dienophiles, e.g., bismaleimides and/or trismaleimides to give the corresponding polyimides in quantitative yields. When maleimides such as bismaleimide and/or trismaleimide are used as the dienophile, the resulting polyimides of this invention have glass transition temperatures, (Tg), as high as 300° C.

2. Description of the Prior Art

The preparation of high-performance polymers such as polyimides or polyesters are typically prepared by condensation reactions. In the case of polyimides, the reaction involves diamines and dianhydrides or dianhydride derivatives e.g., the diester of tetracarboxylic acids. This process suffers from several problems in that aromatic diamines are toxic, mutagenic, or carcinogenic. Safe handling and disposal of these materials requires the implementation of costly engineering controls. Further, processing of condensation reaction systems also can be a problem, since this chemistry leads to low molecular weight by-products, e.g., water and alcohols. Evolution of these by-products and high processing temperatures lead to voids and defects in the polymer and the composites prepared with these polymers.

It is known that some of these processing problems can be overcome, however, by combining addition chemistry with condensation chemistry, as is the case for PMR-15 polyimides. With this approach, low molecular weight oligomers (short chain polymers) are prepared by the condensation of diamines with dianhydrides or its derivatives and a suitable endcapping group. The endcaps undergo a cross-linking reaction at high temperatures (typically in excess of 300° C.) to provide a polymer network having good solvent resistance and high temperature performance. Prior to cross-linking, however, the imide oligomers are somewhat fluid, and volatile condensation by-products can be removed from the polymer. While this approach overcomes some of the processing difficulties, it requires higher processing temperatures and monomer toxicity is still a concern.

It is known also in the prior art that the Diels-Alder polymerization reaction has been used to prepare high performance polymers such as the polyimides and polyesters. Typical Diels-Alder reactions used to obtain polyimides have involved the reaction of bismaleimides with a suitable bisdiene such as a bisfuran. Other Diels-Alder reactions use a bisdiene precursor, such as bis(benzocyclobutane), to form the bisdiene upon heating to temperatures of 250° C. or higher. Using these Diels-Alder cyclopolymerization reactions overcome the health and safety problems associated with other methods of preparing polyimides, since these reactions do not involve the use of aromatic amines as one of the reactants. However, these methods still require high cure and processing temperatures; see, for example, U.S. Pat. Nos. 5,338,827; 5,322,924; 4,739,030 and the Annual Reviews in Materials Science, 1998, 28, 599–630 by M. A. Meador.

SUMMARY OF THE INVENTION

The unique feature of this invention is that it employs energy from ultraviolet light, rather than heat to form the polymers. While other radiation curable polymers have been developed, these methods employ either free radical or cationic-based polymerization chemistries. The present invention utilizes photochemically generated dienes (not free radicals or carbocations) and standard Diels-Alder cycloaddition chemistry in the polymerization process.

More specifically, this invention relates to polyimides and to the method of preparing polyimides derived from the photochemical cyclopolymerization of approximately stoichiometric amounts of at least one aromatic diketone selected from the group consisting of:

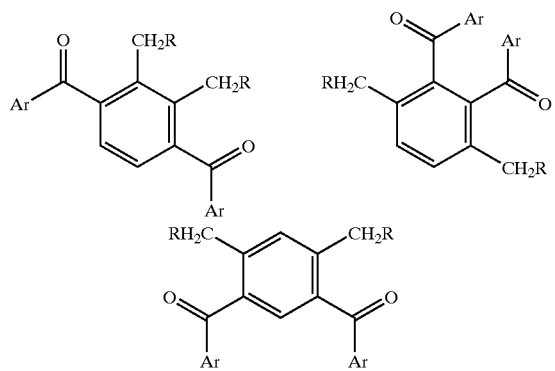

-continued

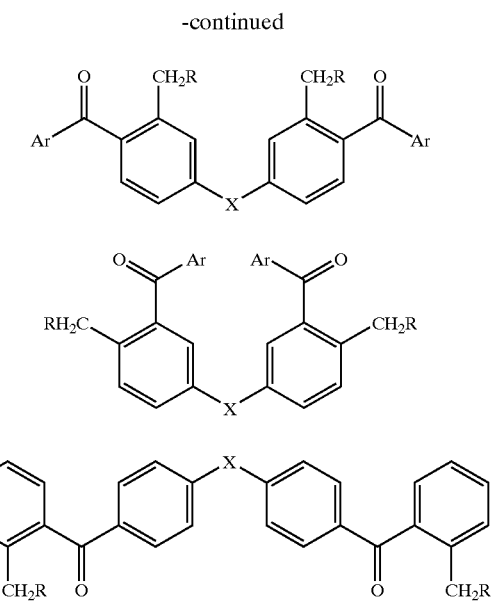

wherein Ar is the same or a different aromatic or substituted aromatic radical e.g., p-methoxy phenyl, p-tolyl, or p-cyanophenyl, and R is the same or a different radical selected from the group consisting of hydrogen, aromatic radicals, substituted aromatic radicals, lower alkyl radicals of 1 to 8 carbons, $O_2CR_1$ and —$OR_2$ radicals where $R_1$ and $R_2$ are the same or different organic radicals selected from the group consisting of lower alkyl radicals of 1 to 8 carbons e.g. 1 to 4 carbons, aryl and substituted aryl radicals, and X in the diketone formula is selected from the group consisting of nil, oxygen, sulfur, —C=O, —$CH_2$, alkyl radicals of 1 to 8 carbons, ether radicals, ester radicals, aryl radicals and substituted aryl radicals with at least one dienophile selected from the group consisting of bismaleimides, trismaleimides and mixtures of a maleimide end-cap with bismaleimides and/or trismaleimides in various molar ratios to obtain novel polyimides having glass transition temperatures (Tg) as high as 300° C., high thermal-oxidative stability and decomposition-stability temperatures ranging as high as 350° C.

Accordingly, it is an object of this invention to employ energy from ultraviolet light rather than heat to obtain novel polyimides having glass transition temperatures as high as 300° C.

It is another object of this invention to provide a novel method of preparing polyimides at ambient temperatures by using radiant energy to photochemically cyclopolymerize aromatic diketones and one or more dienophiles.

It is another object of this invention to provide a method of preparing radiation curable polyimides that do not have the health risk associated with conventional methods that utilize toxic aromatic diamines.

It is a further object of this invention to provide novel polyimides, and a novel process of preparing cured polyimides by using radiation energy at ambient temperatures to polymerize at least one aromatic diketone and dienophiles without using free radical or cationic polymerization methods.

These and other objects of this invention will become apparent from a further and more detailed description of the invention as follows:

DESCRIPTION OF THE PREFERRED EMBODIMENTS

This invention enables the curing of high performance polymers at or near room temperature by using ultraviolet light (or some other radiation sources, such as electron beams) rather than heat to provide the cure energy. In general, the invention involves the Diels-Alder cyclopolymerization of photochemically generated dienes with dienophiles, such as bismaleimides. The general chemistry is described in Scheme 1, for a representative polyimide. The irradiation of an aromatic diketone produces two distinct hydroxy o-quinodimethane (photoenol) intermediates. These intermediates are trapped via a Diels-Alder cycloaddition with appropriate dienophiles, e.g., bismaleimide, added prior to irradiation, to give the corresponding polymers in quantitative yields. For example, when bismaleimides are used as the bisdienophile, the resulting polyimides have glass transition temperatures, (Tg) as high as 300° C. depending upon the chemical structures of the diketone and the bismaleimide. More importantly, recent work has demonstrated that polyimide films can be prepared by using ultra-violet radiation on high-solids content varnishes with the appropriate monomers in a small amount of solvent, e.g. cyclohexanone, dimethyl formamide, N-methylpyrollidone and the like.

The general chemistry for the preparation of either polyesters or polyimides from Diels-Alder trapping of photochemically generated bisdiene intermediates is shown (Scheme 1) as follows:

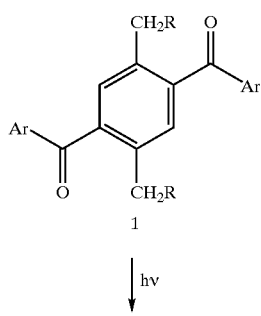

1

↓ hv

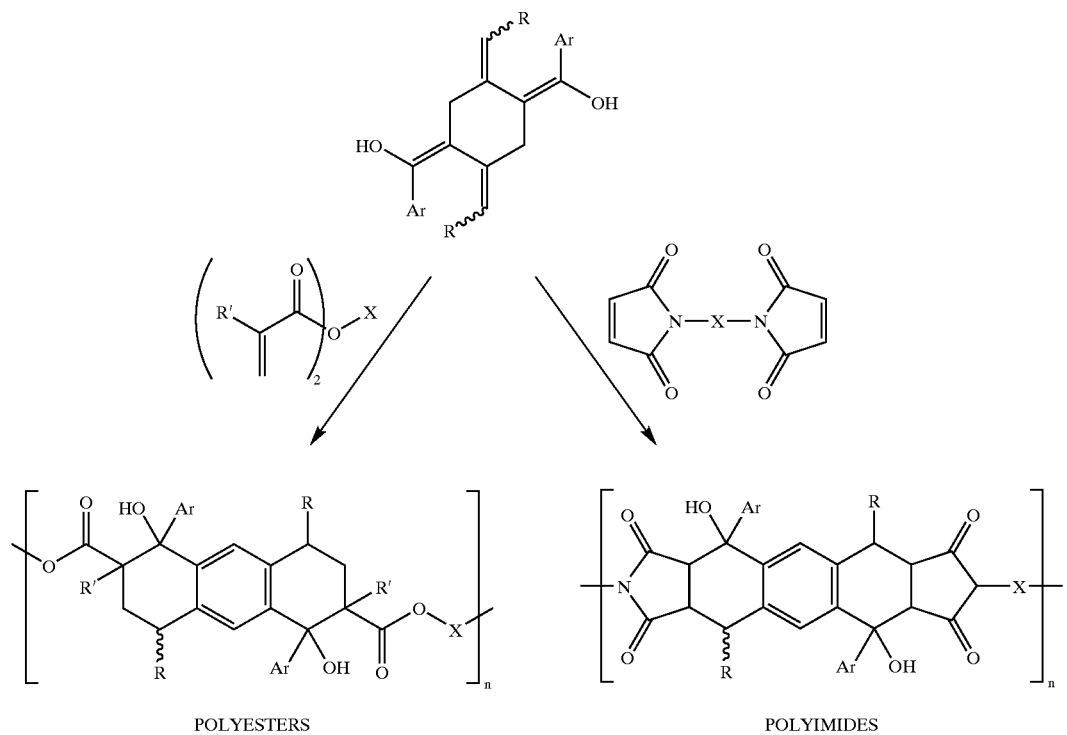

POLYESTERS          POLYIMIDES

Other diketones that can be used in preparing the novel polyimides (as shown in Scheme 1) include the following

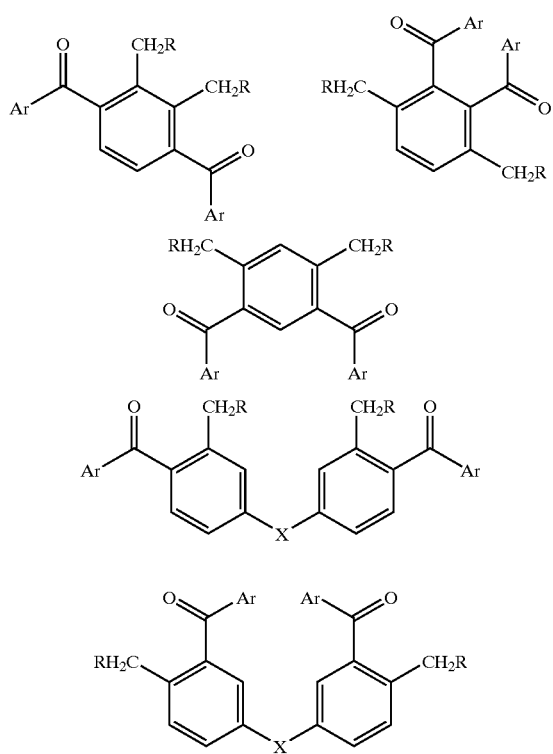

wherein Ar is the same or a different aromatic or substituted aromatic radical e.g. p-methoxy phenyl, p-tolyl, or p-cyanophenyl, and R is the same or a different radical selected from the group consisting of hydrogen, aromatic radicals, substituted aromatic radicals, lower alkyl radicals of 1 to 8 carbons, $O_2CR_1$ and $—OR_2$ radicals wherein $R_1$ and $R_2$ are the same or different radicals selected from the group consisting of lower alkyl radicals of 1 to 8 carbons, e.g. 1 to 4 carbons, aryl and substituted aryl radicals, and X in the diketone formulas is selected from the group consisting of nil, oxygen, sulfur, —C=O, $CH_2$, primary, secondary or tertiary alkyl radicals of 1 to 8 carbons, aryl or aromatic radicals, substituted aromatic radicals, primary, secondary or tertiary ethers, poly(ethers), ester radicals, and poly(aryls), having the formula:

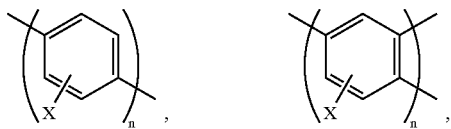

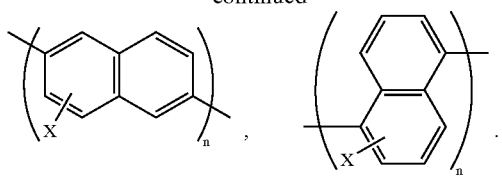

wherein n has the value of 1 or 2, and X in the poly(aryl) formulas is a lower alkyl substituent or nil.

In addition to bismaleimides, the trismaleimides can be used as the dienophile either alone or as a mixture with a maleimide end-cap and/or with bismaleimides as a mixture in stoichiometric molar ratios. Structures of these trisdienophiles include, for example:

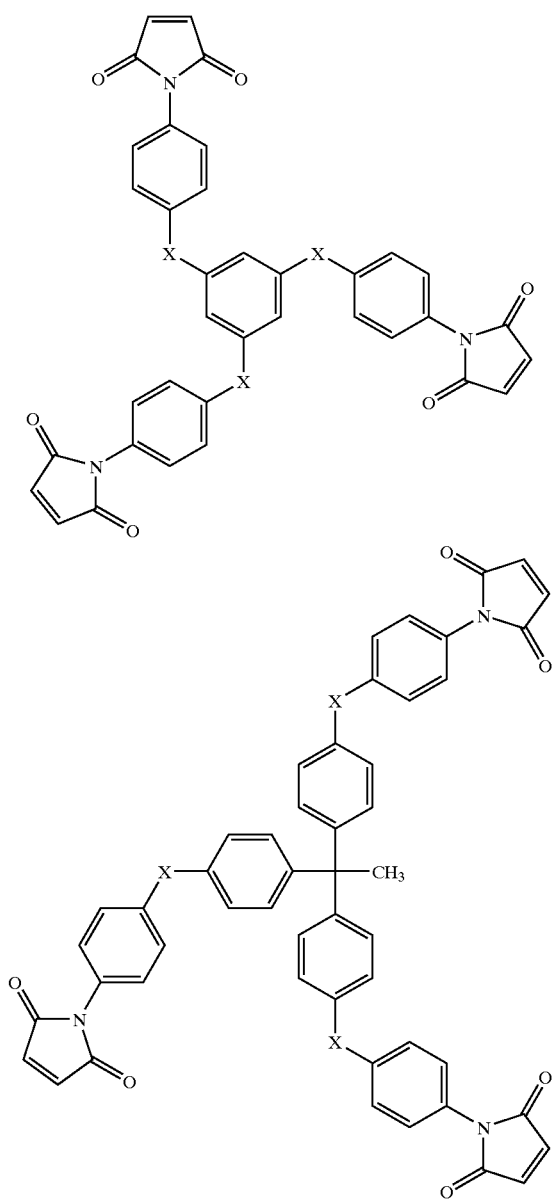

wherein X in the trismaleimide formulas is selected from the group consisting of nil, oxygen, —$CH_2$, and —C=O.

More specifically, the polyimides of this invention are derived from the photochemical cyclopolymerization at ambient temperatures of approximately stoichiometric amounts of at least one (a) aromatic diketone selected from the group consisting of:

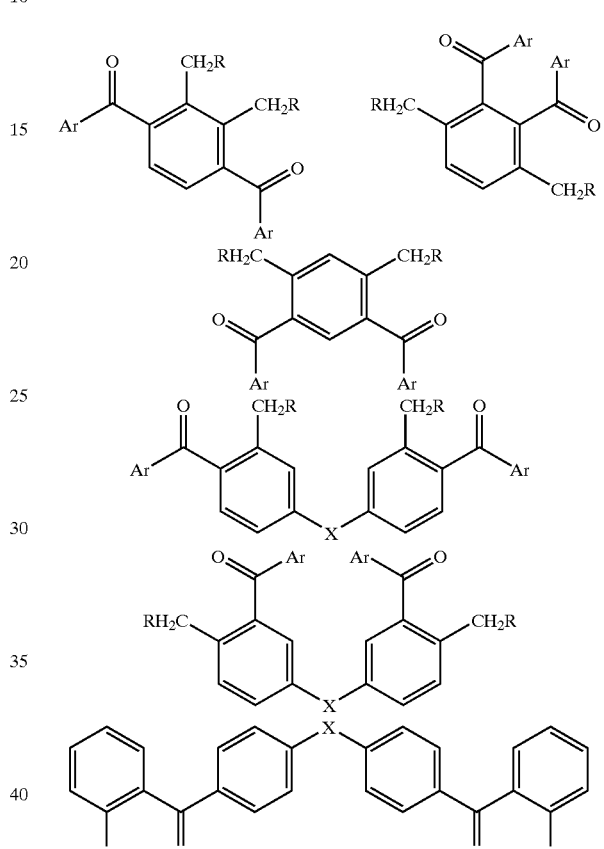

wherein Ar is the same or a different aromatic or substituted aromatic radical e.g. lower alkyl substituents and R is the same or a different radical selected from the group consisting of hydrogen, aromatic radicals, e.g. substituted aromatic radicals, lower alkyl radicals of 1 to 8 carbons, $O_2CR_1$ and —$OR_2$ radicals wherein $R_1$ and $R_2$ are the same or different radicals selected from the group consisting of lower alkyl radicals of 1 to 8 carbons e.g. 1 to 4 carbons and aryl and substituted aryl radicals, and X in the above diketone formulas is selected from the group consisting of nil, oxygen, sulfur, —C=O, —$CH_2$, alkyl radicals of 1 to 8 carbons, ether or poly(ether) radicals, ester radicals, and aryl or poly(aryl) radicals with at least one (b) dienophile selected from the group consisting of bismaleimides, trismaleimides and mixtures of a maleimide with bismaleimides and/or trismaleimides in effective molecular or equivalent ratios e.g. 0 to about 25 molar percent of the endcap maleimide with the bismaleimides and/or trismaleimides to obtain novel polyimides having glass transition temperatures (Tg) ranging up to about 300° C., high thermal-oxidative stability and decomposition-stability temperatures ranging as high as 350° C.

More specifically, the novel polyimides of this invention are derived, for example, by photochemically cyclopolymerizing, preferably, with ultra-violet light at ambient temperatures stoichiometric amounts of an (a) aromatic diketone having the formula:

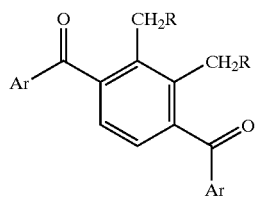

wherein Ar is the same or a different aromatic or substituted aromatic radical and R is the same or different radical selected from the group consisting of hydrogen, aromatic radicals, lower alkyl radicals of 1 to 8 carbons, $O_2CR_1$ and $-OR_2$ radicals wherein $R_1$ and $R_2$ are the same or different radicals selected from the group consisting of lower alkyl radicals of 1 to 8 carbons, and aryl radicals, and (b) at least one bis(maleimide) selected from the group consisting of:

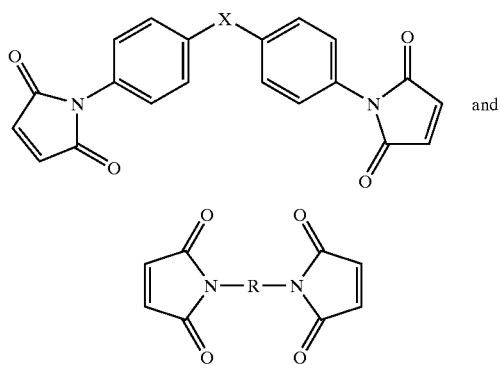

wherein X in the above bis(maleimide) formula is selected from the group consisting of oxygen, —C=O, $SO_2$, —$CH_2$, nil, ether radicals, poly(ether) radicals, ester radicals, polyester radicals, aromatic and poly(aromatic) radicals, and R in the above bis(maleimide) is selected from the group consisting of alkyl(primary, secondary, or tertiary) radicals, ether radicals, poly(ether) radicals, ester radicals, and poly(ester radicals).

Depending on the specific aromatic ketone and dienophile used in the cyclopolymerization process of this invention, each polyimide derived from said polymerization will have a different repeating unit as shown by the formulas (4, 6, 8, 10, 12, 14 and 16) selected from the group consisting of:

Irradiation of diketones, 3 and 5, produces polyimides containing a 1,5-dihydroxy-1,5-diphenyl-1,2,3,4,5,6,7,8-octahydrophenanthrene unit, 4 and 6.

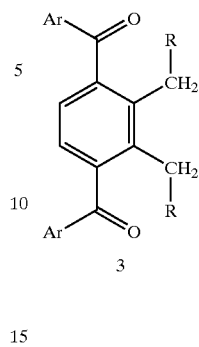

3

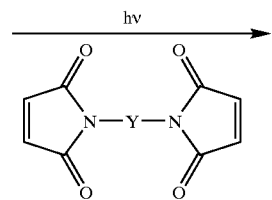

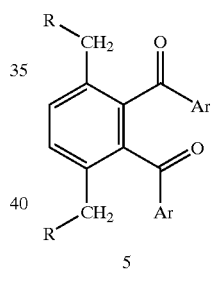

5

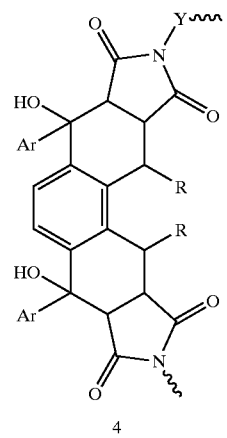

Irradiation of diketones, 7, 9, and 11 and triketone 13 produces polyimides 8, 10, 12 and 14 containing a 1-hydroxy-1-phenyl-1,2,3,4-tetrahydronaphthalene unit.

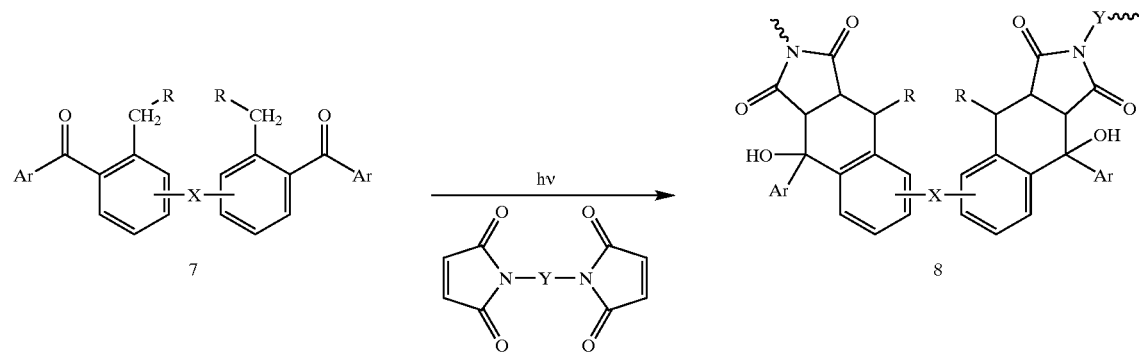
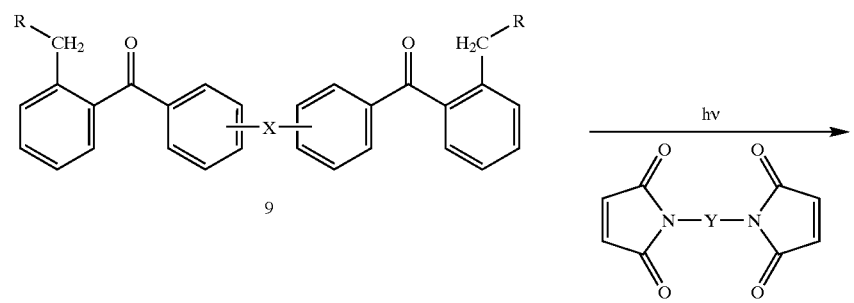
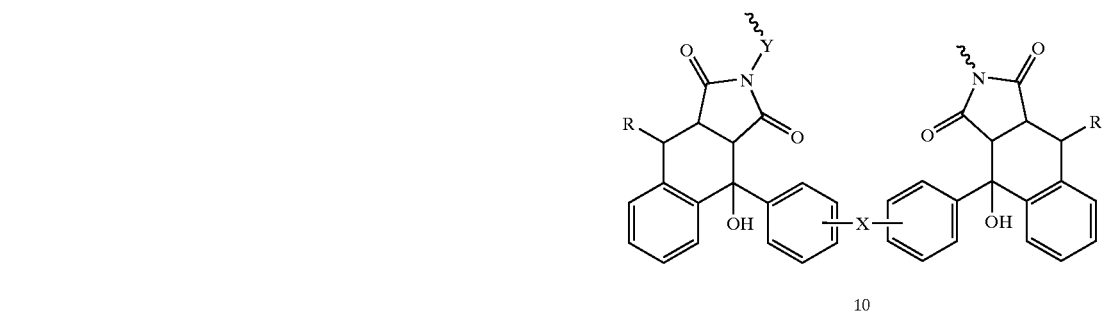
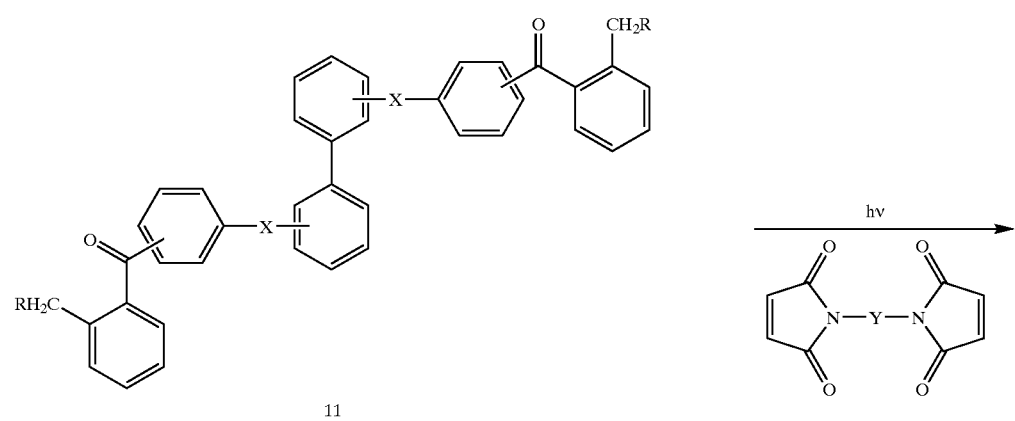

-continued
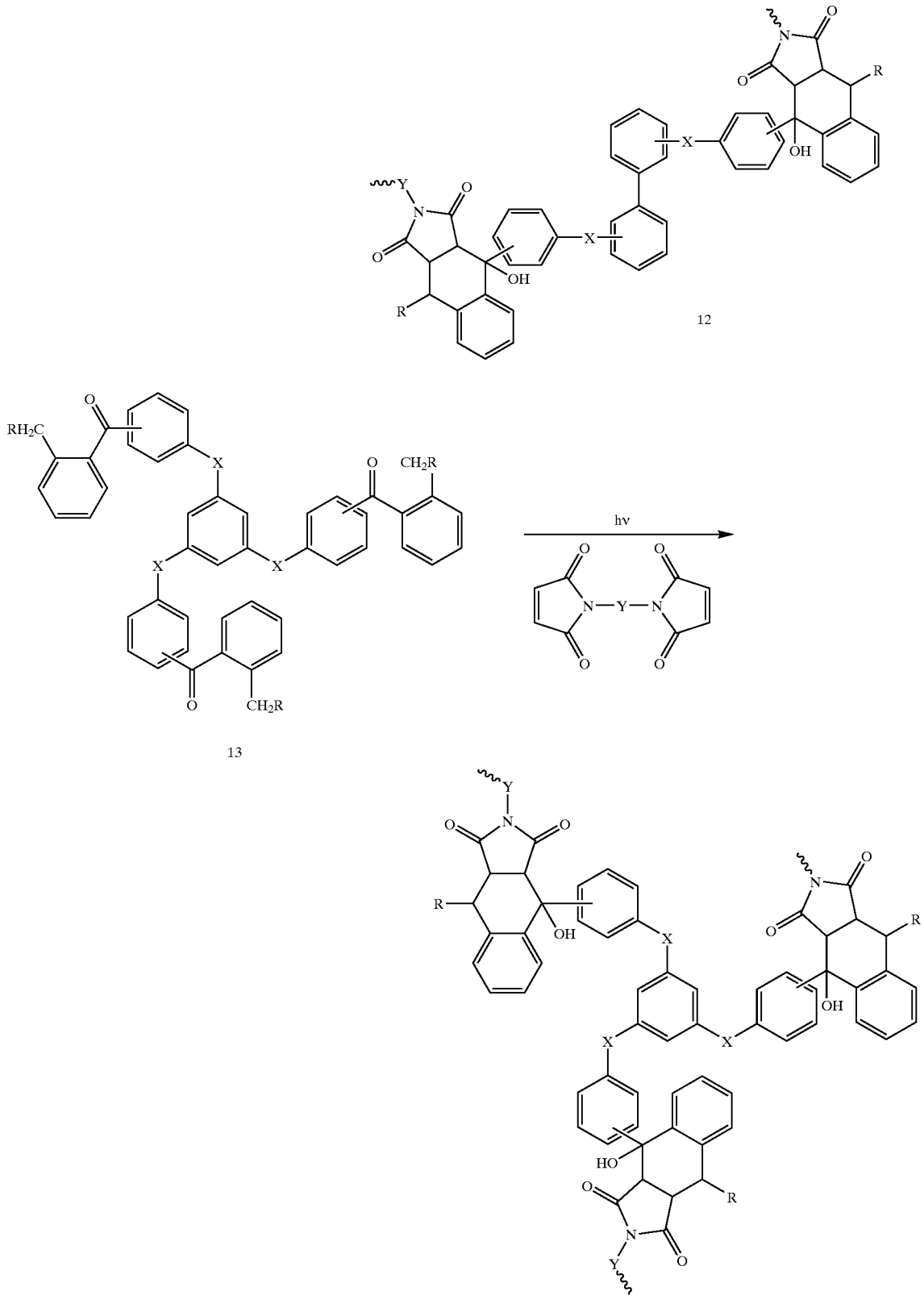

Irradiation of diketone 15 produces polyimide 16 with an octahydroanthracene repeat unit, wherein the phenyl substituents are in the 1,8 positions.

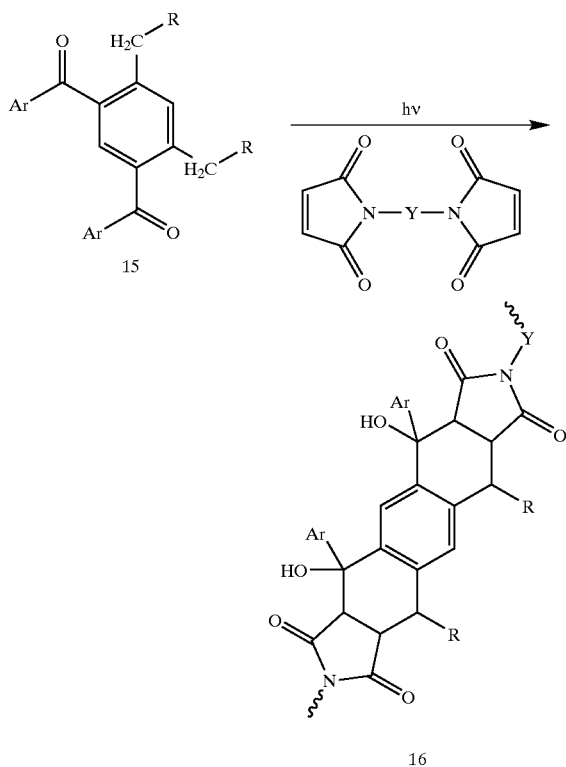

In the above formulas i.e. 3 through 16, Ar is the same or a different aromatic or substituted aromatic radical, R is selected from the group consisting of hydrogen, heteroaryl and lower alkyl radicals of 1 to 8 carbons, X is selected from the group consisting of nil, oxygen, sulfur, —C=O, —CH$_2$, alkyl radicals of 1 to 8 carbons, ether radicals, ester radicals, and aryl radicals and Y is selected from the group consisting of nil, oxygen, —CH$_2$, —C=O, SO$_2$, ether radicals, ester radicals, polyether radicals, polyester radicals, aromatic or aryl radicals and lower alkyl radicals.

The novel polyimides i.e. 4, 6, 8, 10, 12, 14 and 16 shown in the above formulas have glass transition temperatures (Tg) ranging up to about 300° C., high thermal-oxidative stability and decomposition-stability temperatures as high as 350° C.

The following examples illustrate the novel process of obtaining either polyimides or polyacrylates by photochemically cyclopolymerizing diketones and dienophiles at ambient temperatures.

EXAMPLE 1

A benzene solution containing an equimolar amount of 4,4'-bis(2-methylbenzoyl)diphenyl ether and 4,4'-bismaleimido diphenylmethane was degassed under nitrogen for 1 hour. The resulting stirred solution was irradiated under a nitrogen atmosphere for 18 hours using ultraviolet light from a 250 Watt medium pressure Mercury vapor lamp filtered through Pyrex. The solvent was removed under vacuum and the resulting residue triturated with methanol and filtered to obtain a novel polyimide (100% yield).

Infrared analysis (KBr pellet) showed the absence of the diketone carbonyl at 1655 cm$^{-1}$ indicating complete reaction of the diketone and the presence of imide carbonyl peaks at 1711 and 1778 cm$^{-1}$ confirming formation of the desired polyimide. Thermal analysis of the polyimide shows a Tg of 184° C. (measured by Differential Scanning Calorimetry) and an onset of decomposition, Td, of 321° C. (measured by Thermal Gravimetric Analysis).

EXAMPLE 2

A 10 wt % solution of an equimolar amount of 2,5-dibenzoyl-1,4-dimethylbenzene and the bismaleimide of bis-aniline-P in cyclohexanone was placed in a Petri Dish. The solvent was allowed to evaporate in a fume hood and the resulting gummy film was placed in a sealed chamber fitted with a quartz window and degassed with argon for about 2 minutes. The chamber was placed on the conveyor belt of a thin film uv curing apparatus and irradiated for a total of 20 passes (approximately 20 minute exposure time) using light from a broad spectrum ultraviolet-visible lamp (irradiation spectrum ranged from 200 to 580 nm, with a maximum at 360 nm). The Petri dish was removed from the sample chamber and heated overnight (approximately 18 hours) in a vacuum oven at 80° C. to remove any residual solvent.

Infrared analysis (NaCl plates) of the resulting film showed no benzophenone carbonyl at 1655 cm$^{-1}$ indicating complete reaction of the diketone and the presence of imide carbonyl peaks at 1778 and 1711 cm-1 confirming formation of polyimide. Thermal analysis of this film showed at Tg at 170° C. (measured by Differential Scanning Calorimetry) and an onset of decomposition at 220° C. (measured by Thermal Gravimetric Analysis).

EXAMPLE 3

A benzene solution containing an equimolar amount of 2,5-dibenzoyl-1,4-dimethylbenzene and 1,4-butanediol diacrylate was degassed under nitrogen for 1 hour. The resulting stirred solution was then irradiated under a nitrogen atmosphere for 18 hours using ultraviolet light from a 250 Watt medium pressure Mercury vapor lamp filtered through Pyrex. The solvent was removed under vacuum and the resulting residue triturated with methanol and filtered to afford the corresponding polyester (100% yield).

Infrared analysis (KBr pellet) shows the absence of the diketone carbonyl at 1655 cm$^{-1}$ indicating complete reaction of the diketone and the presence of an ester carbonyl absorption at 1750 cm$^{-1}$ confirming formation of the desired polyester. Thermal analysis of the polyester shows a Tg of 160° C. (measured by Thermal Mechanical Analysis) and an onset of decomposition, Td, of 308° C. (measured by Thermal Gravimetric Analysis).

EXAMPLE 4

A 10 wt % cyclohexanone solution of 2,5-dibenzoyl-1,4-dimethylbenzene and a mixture of pentaerythritol propoxylate triacrylate and 1,6-hexanediol ethoxylate diacrylate in the proper stoichiometry was placed in a Petri Dish. The solvent was allowed to evaporate in a fume hood and the resulting gummy film was placed in a sealed chamber fitted with a quartz window and degassed with argon for about 2 minutes. The chamber was placed on the conveyor belt of a thin film uv curing apparatus and irradiated for a total of 20 passes (approximately 20 minute exposure time) using light from a broad spectrum ultraviolet-visible lamp (irradiation spectrum ranged from 200 to 580 nm, with a maximum at 360 nm). The Petri dish was removed from the sample chamber and heated overnight (approximately 18 hours) in a vacuum oven at 80° C. to remove any residual solvent.

Infrared analysis (NaCl plates) of the resulting film showed no benzophenone carbonyl at 1655 cm$^{-1}$ indicating complete reaction of the diketone and the presence of an ester carbonyl at about 1750 cm$^{-1}$ confirming formation of polyester. Thermal analysis of this film showed at Tg at 50° C. (measured by Differential Scanning Calorimetry) and an onset of decomposition at 210° C. (measured by Thermal Gravimetric Analysis).

The ultraviolet-curing process of this invention offers several advantages over other known processes for the preparation of polyimides and polyesters. Ultraviolet cured films, for example, undergo less shrinkage during cure in comparison to films that are cured at high temperatures. Moreover, this process is particularly useful for curing polyimides and polyesters that contain thermally sensitive organic groups or additives as nonlinear optical materials. In addition, this process does not entail some of the disadvantages of the condensation-chemistry-process; namely, the formation of volatiles during cure, health risks associated with aromatic diamines, and poor solution stability. Specifically, the polyimides and polyesters of this invention are characterized as having high glass transition temperatures, good mechanical properties and improved processing in the manufacture of adhesives, films and electronic materials. The polyimides and polyacrylates are particularly useful in preparing fiber reinforced composites used as the preferred structural materials in military and civil applications such as jet engine cowls, ducts and the like because of their lightweight, load-bearing characteristics and their oxidative stability at high temperatures.

While this invention has been described by a number of specific examples, it is obvious that there are other variation and modification that can be made without departing from the spirit and scope of the invention as set forth in the appended claims.

What is claimed is:

1. Polyimide having a glass transition temperature (Tg) ranging up to about 300° C., high thermal-oxidative stability and decomposition-stability temperatures as high as 350° C. derived from the photochemical cyclopolymerization of approximately stoichiometric amounts of an aromatic ketone and at least one dienophile; said polyimide having a repeating unit of a formula selected from the group consisting of:

(a)
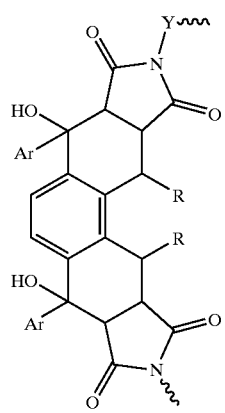

(b)
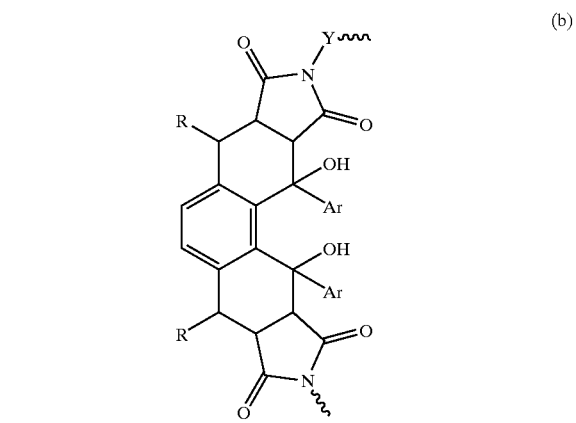

(c)
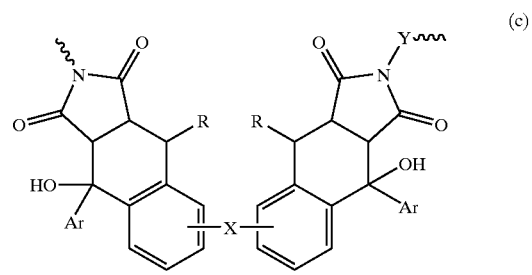

(d)
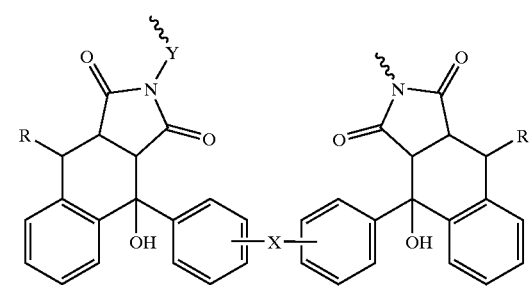

(e)
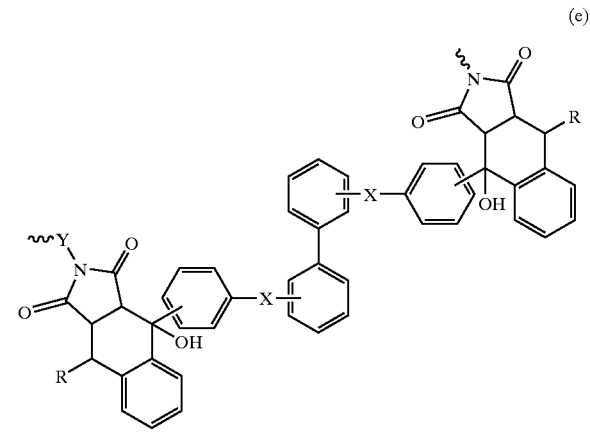

-continued (f)
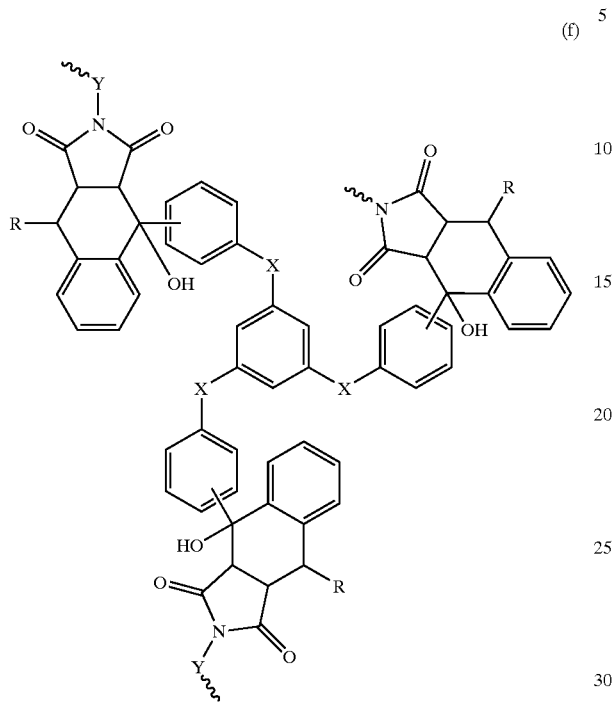

(g)
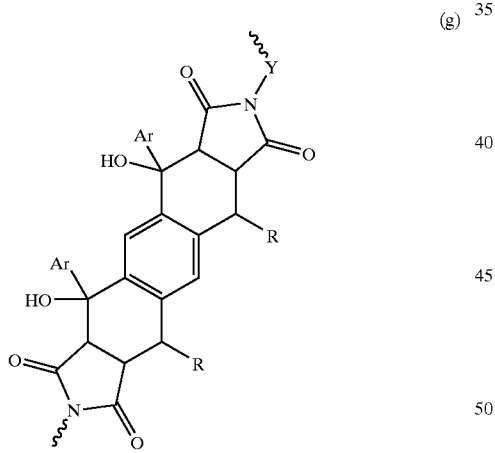

wherein Ar in the repeating unit is the same or a different aromatic or substituted aromatic radical, R is selected from the group consisting of hydrogen, heteroaryl radicals, and lower alkyl radicals of 1 to 8 carbons, X is selected from the group consisting of nil, oxygen, sulfur, —C=O, —CH$_2$, alkyl radicals of 1 to 8 carbons, ether radicals, ester radicals, and aryl radicals, and Y is selected from the group consisting of nil, oxygen, —CH$_2$, —C=O, SO$_2$, ether radicals, ester radicals, polyether radicals, polyester radicals, aromatic radicals, and alkyl radicals.

2. The polyimide of claim 1 wherein the repeating unit has the formula:

(a)
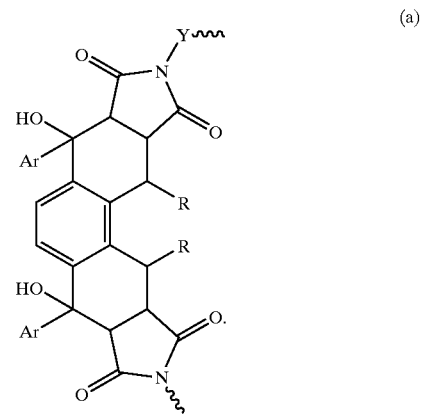

3. The polyimide of claim 2 wherein the ketone has the formula:

wherein R is hydrogen and Ar is an aromatic radical.

4. The polyimide of claim 1 wherein the repeating unit as the formula:

(b)
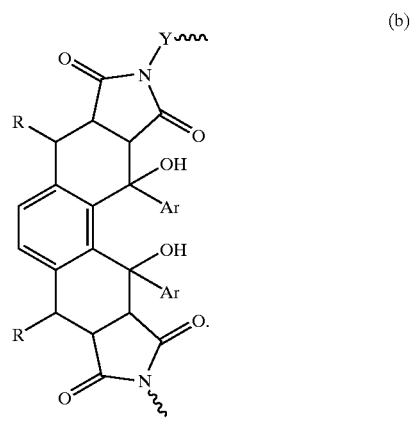

5. The polyimide of claim 4 wherein the ketone has the formula:

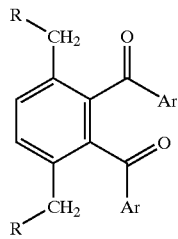

wherein Ar is a substituted aromatic radical and R is a lower alkyl radical of 1–8 carbons.

6. The polyimide of claim 1 wherein the repeating unit has the formula:

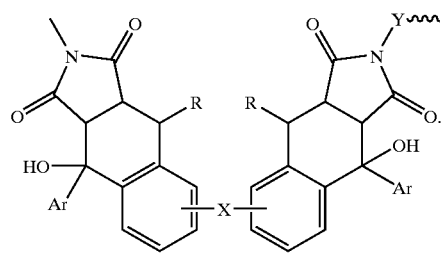

(c)

7. The polyimide of claim 6 wherein the ketone has the formula:

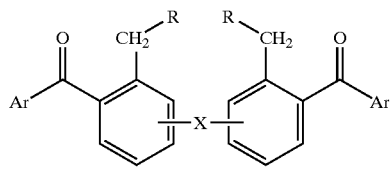

where Ar is an aromatic radical, R is hydrogen and X is —CH$_2$.

8. The polyimide of claim 1 wherein the repeating unit has the formula:

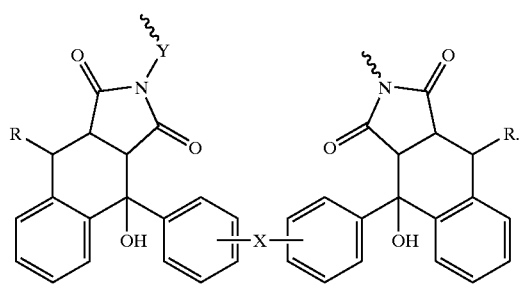

(d)

9. The polyimide of claim 8 wherein the ketone has the formula:

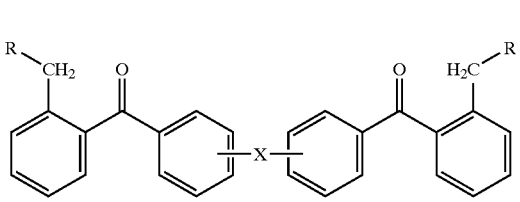

wherein R is hydrogen and X oxygen.

10. The polyimide of claim 1 wherein the repeating unit has the formula:

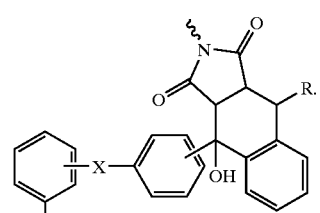

(e)

11. The polyimide of claim 10 wherein the ketone as the formula:

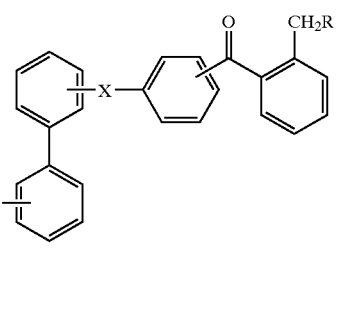

wherein R is hydrogen and X is —CH$_2$.

12. The polyimide of claim 1 wherein the repeating unit has the formula:

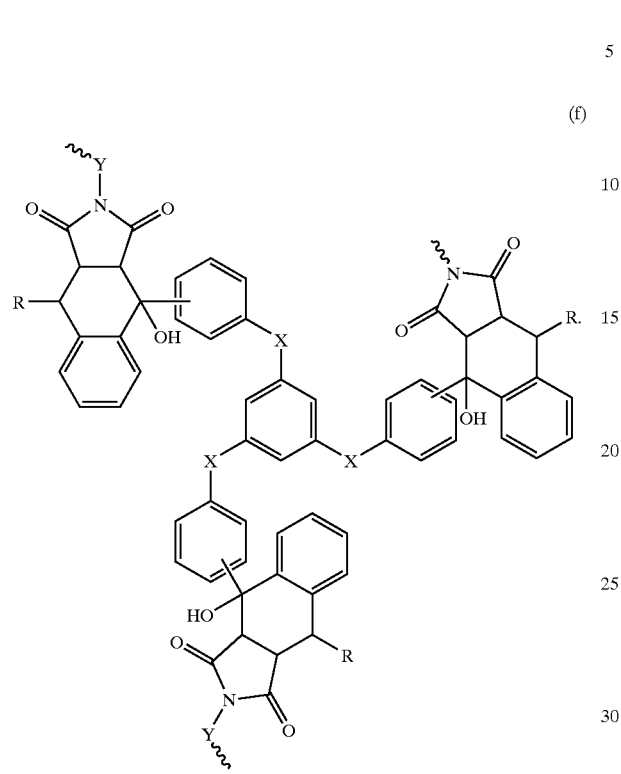

(f)

13. The polyimide of claim 12 wherein the ketone has the formula:

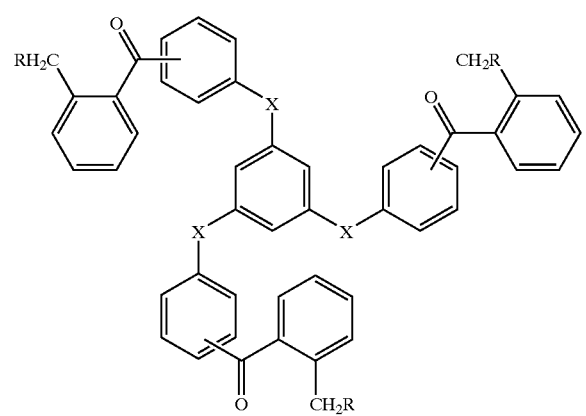

wherein R is an alkyl radical of 1 to 8 carbons and X is —CH$_2$.

14. The polyimide of claim 1 wherein the repeating unit has the formula:

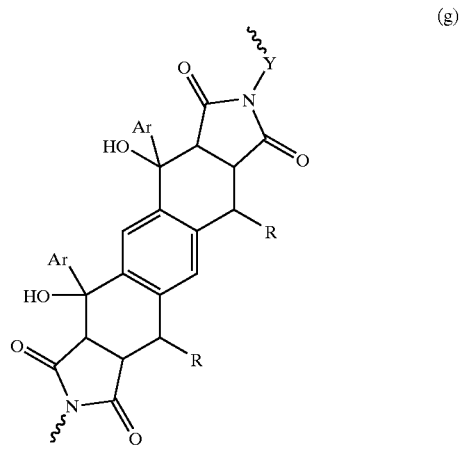

(g)

15. The polyimide of claim 14 wherein the ketone has the formula:

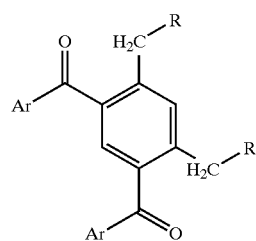

wherein R is hydrogen and Ar is an aromatic radical.

16. The polyimide of claim 1 wherein the dienophile is selected from the group consisting of bismaleimides, trismaleimides and mixtures of maleimides with bismaleimides and/or trismaleimides wherein the dienophile is a mixture of 0.0 to 25 molar percent of maleimides with bismaleimides and/or trismaleimides.

17. The polyimide of claim 16 wherein the dienophile is a bismaleimide.

18. The polyimide of claim 16 wherein the dienophile is a trismaleimide.

19. The polyimide of claim 16 wherein the bismaleimide has the formula:

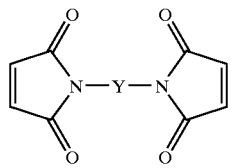

wherein Y is —CH$_2$.

20. The polyimide of claim 16 wherein the dienophile is a mixture of maleimides with bismaleimides and/or trismaleimides.

* * * * *